United States Patent [19]
Beauregard

[11] Patent Number: 6,068,907
[45] Date of Patent: May 30, 2000

[54] CLOSED EDGE FIBERGLASS CEILING PANELS

[75] Inventor: Ghislain Beauregard, Chesterfield, Mo.

[73] Assignee: Arcoplast, Inc., Chesterfield, Mo.

[21] Appl. No.: 09/337,989

[22] Filed: Jun. 22, 1999

Related U.S. Application Data

[63] Continuation-in-part of application No. 08/998,342, Dec. 24, 1997, abandoned.
[51] Int. Cl.[7] ........................................................ B32B 3/02
[52] U.S. Cl. ................................ 428/71; 428/76; 52/309.9
[58] Field of Search .................................. 428/69, 71, 76, 428/60; 52/309.9

[56] References Cited

U.S. PATENT DOCUMENTS

| | | |
|---|---|---|
| 3,905,167 | 9/1975 | Watkins et al. . |
| 4,463,043 | 7/1984 | Reeves et al. . |
| 5,418,028 | 5/1995 | DeWitt ........................................ 428/60 |
| 5,527,411 | 6/1996 | Jutte . |
| 5,625,999 | 5/1997 | Buzza et al. . |
| 5,827,385 | 10/1998 | Meyer et al. . |

*Primary Examiner*—Alexander Thomas
*Attorney, Agent, or Firm*—Greensfelder, Hemker & Gale, P.C.

[57] ABSTRACT

A foam core ceiling tile having closed edges is provided. An inner foam core is surrounded by a mixture of resin and fiberglass which is cured to a rigid consistency. The sealed surface panel is impermeable to moisture, chemicals and microbial contamination. The sealed panel can achieve up to a 40 pound uniform load capacity. The panel has beveled edges with a perimeter lip for a better fit in suspended T-grid ceiling support systems.

15 Claims, 3 Drawing Sheets

CLOSED EDGE FIBERGLASS CEILING PANELS

RELATED APPLICATION

This application is a continuation-in-part of application Ser. No. 08/998,342, filed Dec. 24, 1997, abandoned.

BACKGROUND OF THE INVENTION

This invention relates to panels and tiles of the type commonly used in ceilings and walls for various industrial, commercial and institutional applications where a contamination controlled environment is desired. Common usages are in the food industry where the minimization and control of microbial foodborne and airborne diseases is critical, and in high technology industries where clean room conditions must be maintained.

These situations require a designated, controlled area in which the processing takes place. For instance, in meat processing plants, there may be separate rooms for slaughtering, de-boning, refrigeration and packaging. Oftentimes, the panels separate the room from various utility resources, such as HVAC systems, which must be maintained. This plenum chamber created by the panels must be readily accessible; hence, the panels must be removable to gain access into the chamber. The need for maintaining a clean, sanitized area is critical to avoid the proliferation of microbial activity. Towards that end, frequent cleaning of the area is necessary. It is therefore necessary to spray down the walls and ceilings. Such harsh treatment requires a panel that is hard and impermeable, and resistant to chemical corrosion and microbial invasion.

There exist foam core composite panels which have a hard, impermeable gel coat facing. These are quite adequate for their intended use of providing resistance to chemical corrosion and microbial invasion, and are able to withstand the harsh spray-down cleaning process. However, the gel coat surface is really only effective where it is in place. There are parts of the foam core panel which do not have the gel coat facing, i.e., the opposite face and the perimeter edges of the panel. Because there are areas on the panel that are not provided with the gel coat facing, the panel is still subject to moisture, chemical and microbial invasion through the unprotected areas. Hence, the panels will still eventually suffer damage to their structural and compositional integrity from these elements.

There have not been any panels or tiles that have adequately addressed the problem of the unprotected foam substrate. Applying the gel coating to all surfaces of the panel can get quite expensive and is not cost effective. Panels that have the gel coating on both face surfaces still, however, have their side edges unprotected. The manufacturing process for these composite panels is such that they are typically cut in tile dimension, leaving the four side edges uncovered by the gel coating and the inner foam substrate exposed. Open edges can still permit water and chemical absorption and microbial contamination. Moisture that is absorbed by the foam substrate will expand and contract during freeze and thaw cycles causing the panel to crack and swell over time. Further, moisture contributes to vapor formation on the surface of the panel which can contribute to contamination. Also, loose particles may become dislodged from the foam core substrate and become airborne, which can contribute to contamination of the processing room area bounded by the panels. Further, open edge panels are structurally weak and are vulnerable to delamination.

While there exists panels that do have completely closed edges, their configuration typically comprises a blunt, truncated edge. While the panel itself may have all the desirable attributes, such as being impermeable and having good structural integrity, the blunt edge can present installation difficulties with suspended ceiling grid systems. Grid systems comprise inverted T-runners having a web structure and hanger wire attachment leaving only minimal clearance over their supportive shelf upon which the panel edge rests. Occasionally, a panel edge must be cut so that it will fit in the available space over the shelf on the T-grid. However, if the edge is cut, the benefit of the closed edge is destroyed, as the interior of the panel would then be exposed. Further, if the tile edge is not cut, its blunt edge may cause the T-grid to bend, leaving a distortion.

Thus, there is a need for a ceiling and wall panel or tile which can provide the structural integrity necessary to withstand the rigorous environmental and maintenance conditions that exist in these aforementioned industries. It is further desirable that these panels be completely resistant to water, chemical and microbial contamination. Further yet, there is a need for a ceiling tile which can be easily removed from a T-grid suspension system to allow access to the plenum area above the tiles.

SUMMARY OF THE INVENTION

By means of the instant invention there is provided a panel for ceiling and wall applications that provides a completely sealed surface. The panel is comprised of a foam core substrate which is encased in a resin-impregnated fiberglass mat, which is then cured to a sufficient degree so that a permanently hard, impermeable surface is created. The resultant closed-edge panel is resistant to moisture, chemical and microbial absorption.

The closed edge panel is prepared by first laying down a resin-impregnated fiberglass mat in a mold. A foam substrate is then placed over the mat with the foam substrate formed to have a bevelled edge, and then a second resin-impregnated fiberglass mat is placed over the foam substrate in a sandwich arrangement. The edges of the respective mats are sealed together to enclose the foam core substrate. The edges of the fiberglass mats are extended beyond the foam substrate to form a lip. A gel coat facing is typically applied on one or both of the surfaces of the panel. The closed edge panel of this invention can achieve up to a 40 pound uniform load.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
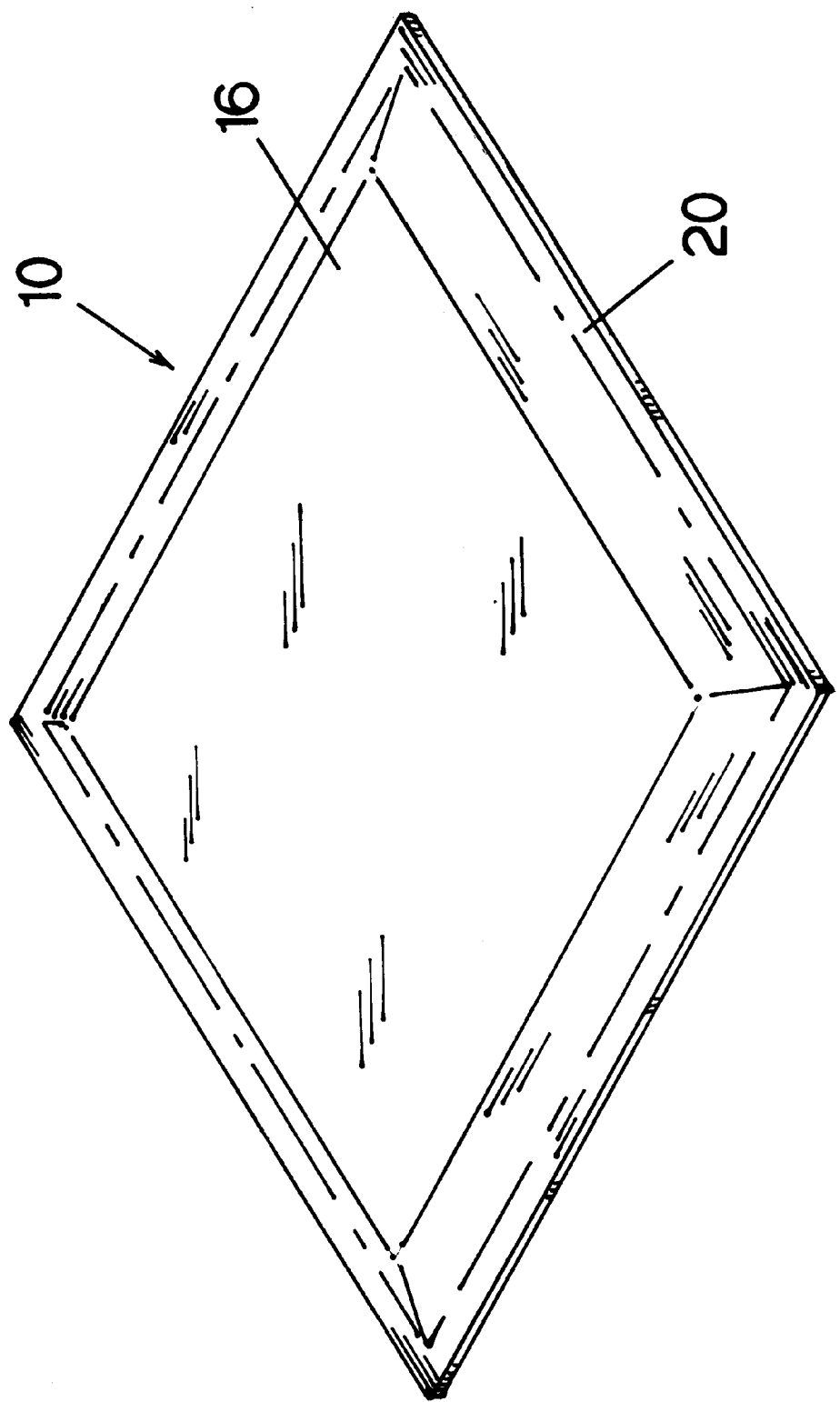
FIG. 1 is a perspective view of the closed edge panel.
Figure 2:
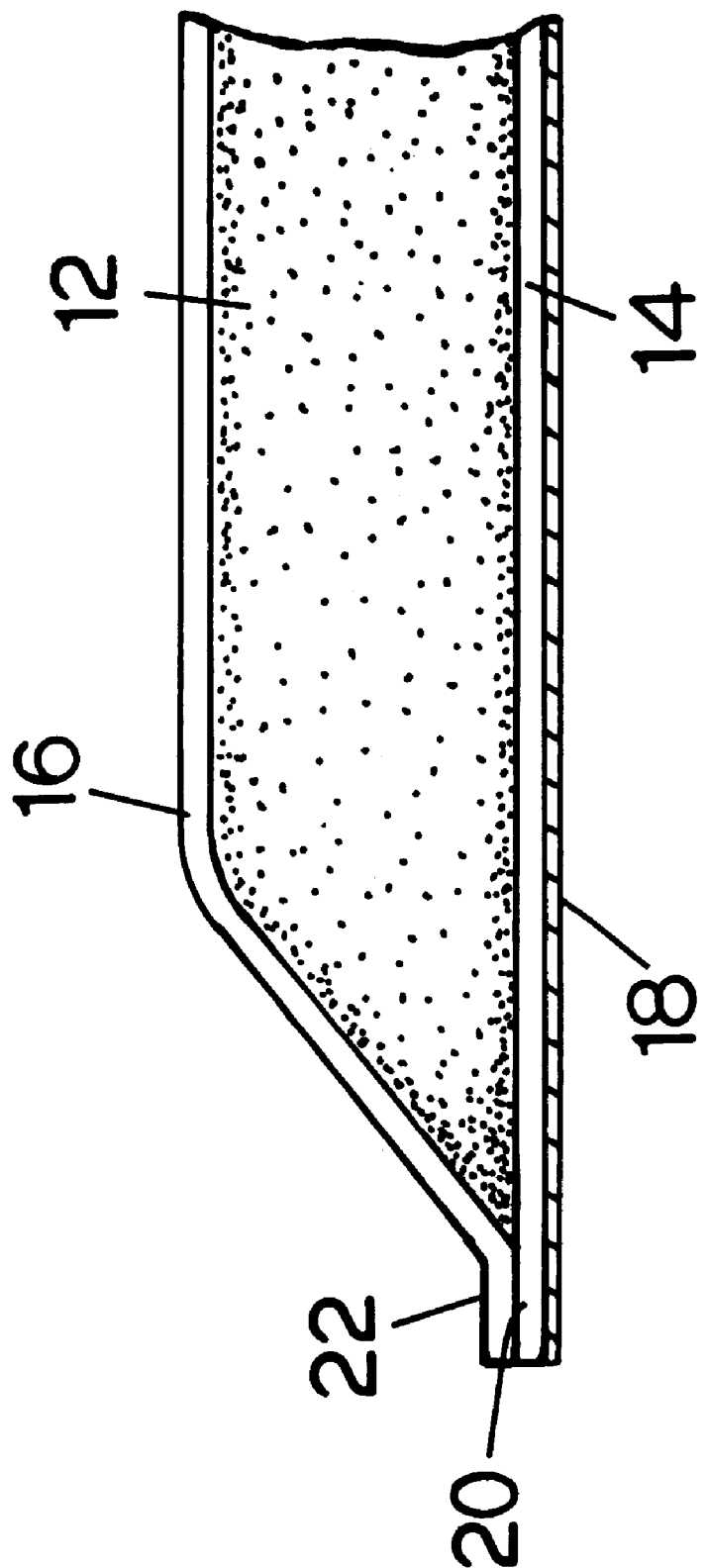
FIG. 2 is a cross-sectional view taken in side elevation of the closed edge panel.

The closed edge panel 10 of the instant invention is generally shown in FIG. 1. As shown in FIG. 2, it comprises a foam core 12 of polyisocyanurate board insulation. Other foam substrates known to those skilled in the art, such as cementuous core cement board, may also be used, providing they are structurally and chemically compatible for the required performance expectations of the industrial applications under which the panels are used. It is also contemplated that other compatible substrates, such as mineral board, gypsum board and honeycomb cell may also be used. The density of the polyisocyanurate foam should be in the range of 1.7 to 2.2. pounds per cubic foot. Foam core 12 is enclosed within base mat 14 and cover mat 16. Both of these mats are comprised of fiberglass impregnated with a fire-retardant resin. A common fiberglass type, such as M127, marketed by Certainteed, Inc. is used. A common resin type used in Reichold 7767, manufactured by Reichold Chemicals, Inc. A gel coat facing 18 is typically provided on the surface of panel 10. Such get coats commonly used in the industry provide a fire-retardant, hard, smooth, glossy finish.

The panel achieves its rigid, impermeable qualities through the manufacturing process. A mold having a predetermined form, ideally in a rectangular or square shape is first wetted down with resin. Resin-saturated fiberglass is wrapped into a mat 14 and deposited in the mold. If a gel coat is to be applied to the panel, it is laid down in the mold prior to laying down the resin-impregnated fiberglass mat. Mat 14 is then wetted down with resin. The foam 12 is placed down on the base mat 14, leaving a perimeter area 20 of base mat 14 uncovered. The foam is cut at its edge to leave an angled, beveled shape from about 30°–60°. Cover mat 16, whose dimensions are slightly larger than the layer of foam core 12, is next applied and also wetted with resin. The excess edge 22 of mat 16 extending beyond foam core 12 is sealed onto the perimeter area 20 of base mat 14 to form a lip 24. The resultant closed edge panel is then cured to a rigid consistency. The dimensions of the panel can vary according to need and standard industry use. Typical dimensions are 4'×4', 2'×4', or 2'×2' in area, and thickness ranging from ½ inch to four inches.

Due to the cured resin/fiberglass exterior, the panel becomes impermeable to moisture, chemicals and bacteria. Further, the closed edge panel has a high degree of thermal resistance, within the range between –40° F. to 180° F. These qualities are critical in that the panel is unaffected by freeze and thaw cycles. On a conventional, open-edged panel, moisture would seep into the foam core of the panel and condensation would generate on the exterior surface during freeze and thaw cycles. This could lead to microbial contamination on the panel surface which could then be transmitted into the room within the panel enclosure. The closed edge panel would not be subject to condensation problems as moisture could not permeate the resin fiberglass exterior. The closed edge panel has a substantially increased, and virtually unlimited, longevity because it is not subject to the destructive effects of these various invasive elements.

The resin-impregnated mats 16 and 14 provide the structural strength of the closed edge panel. The core shear strength of the panel is thus enhanced by the layered and wrap-around closed edge fabrication and a uniform load capacity of up to 40 pounds is achieved. An optimum ratio of a weight of the resin component to the fiberglass component of the mats is around 2.66 parts weight of resin to around 1 part weight of fiberglass. An optimum ratio of the weight of the mats to the foam core of the fabricated panel is around 8.5 parts weight of mat to around 1 part weight of foam core. When the gel coating is applied to one surface side of the panel, the optimum weight by percentage of components of the panel is 78% mat, 10% foam core and 12% gel coat.

PREFERRED EMBODIMENT

A preferred embodiment for preparing the closed edge panels is set forth as follows. The fiberglass used for the mat is Certainteed 1.5 oz. M127, and the resin is a class I fire retardant resin such as McWhorter 752-4423, Reichold 7767 or Reichold 7704 with 3% antimony trioxide. The foam is polyisocyanurate, such as Elfoam® ½ inch T-200 manufactured by Elliot Company. DENS-DECK® OVERLAYMENT/UNDERLAYMENT board, manufactured by Georgia-Pacific Corporation, is also typically used. The gel coat used is a Neste white fire retardant WG-7X1840. The catalyst or hardener used is Cadox M-50 which is a MEKP catalyst. The resin and gel coat both use between 1.5% to 2.5% of catalyst depending on temperature and humidity. 10% to 1% of a promoter, such as Cobalt or Dimethylaniline, or both, are used in the resin and gel coat. These components are well known by those having skill in the art.

The molds for creating the panels are first prepped and heated to about 90° F. A finished panel product having dimensions of around 4 feet×4 feet is desirable and the most cost effective for the process. A gel coat of about 15 to 20 mils. is applied to the mold using a standard pressure-fed spray gun and is allowed 5 to 7 minutes to cure. After the gel coat is cured, it is wetted down with resin. A layer of 1.5 oz. mat is placed on the resin-wetted gel coat, and is also then wetted with resin. Air rollers are next used to roll out all the air from under the mat prior to placing down the foam substrate. A 47 inch bed of foam is cut to have edges with a 45° angle to facilitate the application of the next layer of mat. The foam is laid down on the base mat such that a ⅜ inch border along the perimeter of the base mat remains uncovered. This border provides a foundation upon which the edge of the cover mat bonds. Pressure is applied to the foam substrate using rollers to allow bonding to the base mat. The foam is then wet with resin prior to receiving the cover layer of the 1.5 oz. mat. This second mat layer must be applied before the first mat layer cures to that bonding between the layers can occur. After the cover mat is laid down, it is again wet with resin and rolled out to remove any air pockets, and then allowed to cure. Any excess of the base or cover mats beyond the border lip is trimmed down using a razor to the proper dimension of the end product panel. This must be done while curing takes place and before the resin becomes too hard, usually within 5 minutes. After a curing time of about 30 minutes, the panel is pulled from the mold and allowed to cool.

Figure 3:
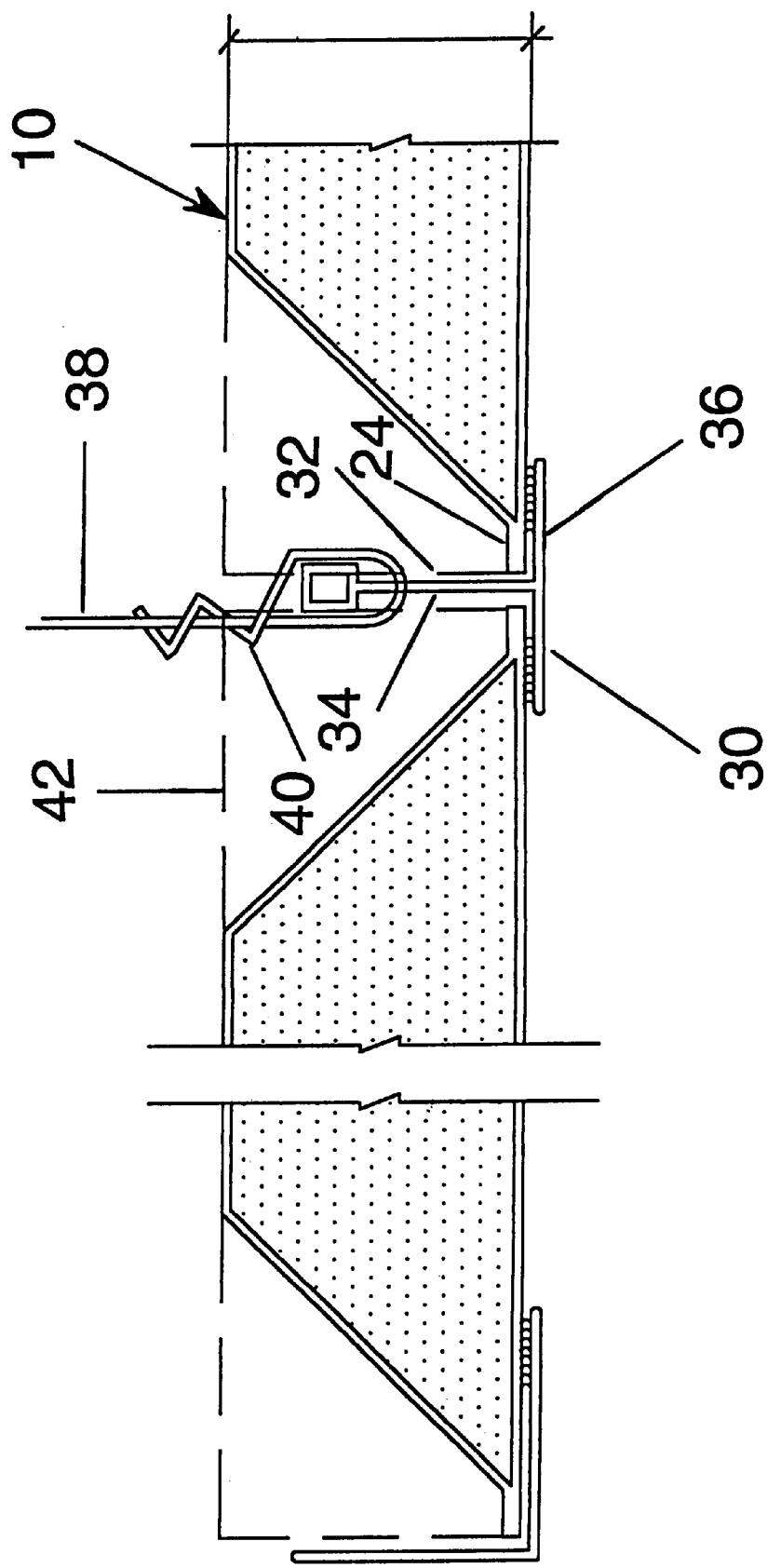
FIG. 3 is a view taken in side elevation of the closed edge panel, partially broken away, installed on a T-grid of a suspended ceiling system.

The total weight of the closed edge panel is between 14 to 20 pounds. In a 14 pound finished product panel, the weight distributed is as follows: gel coat 1.75 lbs., resin 8.0 lbs., foam 1.3 lbs., and fiberglass 3.0 lbs. A core shear strength of kPa (lbs./in.)=193(28) is achieved, allowing an increased load capacity of up to 40 pounds uniform load. Another advantage of the relatively heavy weight of the panel is that it is less likely to be dislodged during spray-down cleaning operations, unlike standard panels which are relatively light in weight. The beveled, closed edge panel with perimeter lip is extremely well suited for use with a T-grid system 30 for a suspended ceiling as shown in FIG. 3, which comprises a framework of runners 32. Each runner has a web portion 34 and shelf support 36. Wire ties 38 are used to suspend runner 32 from a support. The knot 40 created by the tie 38 presents an obstruction on either side of web portion 34. This obstruction prevents a blunt edge panel 42 (shown in dashed lines) from butting up flush with the runner 32. Because of the limited width of shelf support 36, this often creates a seating problem for the blunt edge panel. The beveled edge panel 10 of the present invention, however, provides clearance for the knot 40. Further, lip 24 ensures that panel 10 can butt up flush against web portion 34 and that the panel edge will fully rest on support shelf 36. It is to be understood that, due to the angle of the tile's beveled edge, sufficient clearance of the tile from the knot 40 can be accomplished without a perimeter lip 24, if desired.

Various changes and modifications may be made within this invention as will be apparent to those skilled in the art. Such changes and modifications are within the scope and teaching of this invention as defined in the claims appended hereto.

What is claimed is:

1. A closed edge ceiling panel, said panel being essentially planar and comprising an inner core of foam surrounded by a mixture of resin and fiberglass such that an entire surface area of said panel is covered by said resin and fiberglass mixture, said mixture being cured to a rigid consistency to create an impermeable surface, an edge of said inner core of foam forming a bevelled edge, whereby a perimeter edge of said panel forms a beveled shape co-planar with said panel an angle forming said beveled shape extending in a continuous straight line from a bottom surface to a top surface of the panel, said perimeter edge having an angle in the range between 30 to 60 degrees.

2. The closed edge panel of claim 1 in which a lip extends beyond said beveled edge of said panel.

3. The closed edge panel of claim 1 in which said perimeter edge has an angle of 45 degrees.

4. The closed edge panel of claim 1 in which a lip extends beyond said beveled edge.

5. The closed edge panel of claim 1 in which said core consists of polyisocyanurate foam.

6. The closed edge panel of claim 5 in which said foam core has a density in the range of 1.7 to 2.2 pounds per cubic foot.

7. The closed edge panel of claim 5 in which a ratio of a weight of said mat to a weight of said form core is around 8.5 to 1.

8. The closed edge panel of claim 5 in which a percentage by weight of said mat, said foam core and said gel coat is 78%, 10% and 12%, respectively.

9. The closed edge panel of claim 5 in which said panel has a uniform load bearing capacity of up to 40 pounds.

10. The closed edge panel of claim 5 in which said panel has a core shear strength of kPa (lbs/in.)=193(28).

11. The closed edge panel of claim 1 in which said fiberglass consists of a mat surrounding said core, said mat being impregnated with said resin.

12. The closed edge panel of claim 11 in which a ratio of a weight of said resin to a weight of said fiberglass is around 2.66 to 1.

13. The closed edge panel of claim 1 in which said resin comprises an outer layer of said panel, and said fiberglass comprises a mat forming a layer interiorly adjacent to said resin layer.

14. The closed edge panel of claim 1 in which said panel has a rigid gel coat facing on at least one side.

15. A closed edge ceiling panel, said panel being essentially planar and comprising an inner core of foam surrounded by a mixture of resin and fiberglass such that an entire surface area of said panel is covered by said resin and fiberglass mixture, said mixture being cured to a rigid consistency to create an impermeable surface, an edge of said inner core of foam forming a bevelled edge, whereby a perimeter edge of said panel forms a beveled shape co-planar with said panel and in which a lip extends beyond said beveled edge of said panel.

* * * * *

UNITED STATES PATENT AND TRADEMARK OFFICE
CERTIFICATE OF CORRECTION

PATENT NO.  : 6,068,907
DATED       : May 30, 2000
INVENTOR(S) : Beauregard, Ghislain It is certified that error appears in the above-identified patent and that said Letters Patent is hereby corrected as shown below:

Column 3,
Line 16, "get" should be -- gel --.

Column 4,
Line 39, "to" should be -- so --.

Column 5,
Line 31, change "1" to -- 3 --.

Column 6,
Line 1, change "5" to -- 11 --.
Line 2, change "form" to -- foam --.
Line 4, change "5" to -- 14 --.
Line 23, change "1" to -- 11 --.

Signed and Sealed this

Tenth Day of September, 2002

Attest:

JAMES E. ROGAN
Attesting Officer        Director of the United States Patent and Trademark Office